United States Patent [19]

Kern et al.

[11] Patent Number: 4,622,025
[45] Date of Patent: Nov. 11, 1986

[54] CHAIN-BELT

[75] Inventors: John M. Kern; George A. Zimmer, both of Ithaca, N.Y.

[73] Assignee: Borg-Warner Corporation, Chicago, Ill.

[21] Appl. No.: 656,282

[22] Filed: Oct. 1, 1984

[51] Int. Cl.[4] .............................................. F16G 1/21
[52] U.S. Cl. .................................... 474/245; 474/242
[58] Field of Search ....................... 474/201, 242, 245

[56] References Cited

U.S. PATENT DOCUMENTS

| | | | |
|---|---|---|---|
| 3,016,755 | 1/1962 | Dittrich | 474/201 X |
| 3,138,034 | 6/1964 | Dittrich et al. | 474/201 |
| 3,364,767 | 1/1968 | Bredschneider et al. | 474/242 X |
| 3,431,724 | 3/1969 | Steuer | 474/245 X |
| 4,313,730 | 2/1982 | Cole, Jr. et al. | 474/245 X |
| 4,507,106 | 3/1985 | Cole, Jr. | 474/245 X |

FOREIGN PATENT DOCUMENTS 2949061 11/1981 Fed. Rep. of Germany .

*Primary Examiner*—James A. Leppink
*Assistant Examiner*—Frank McKenzie
*Attorney, Agent, or Firm*—James A. Geppert

[57] ABSTRACT

A metal chain-belt especially usable to drivingly connect the pulleys of a pulley transmission, and constructed of a carrier which may comprise a plurality of sets of links interleaved with those of adjacent sets, with the sets being joined by pivot means. Drive blocks encircle the carrier. The blocks each have side edges adapted to drivingly engage the flanges of the pulleys. These side edges are crowned to improve the life and performance of the chain-belt assembly. The radius of curvature of the crowned side edges is far in excess of the width of a drive block.

14 Claims, 7 Drawing Figures

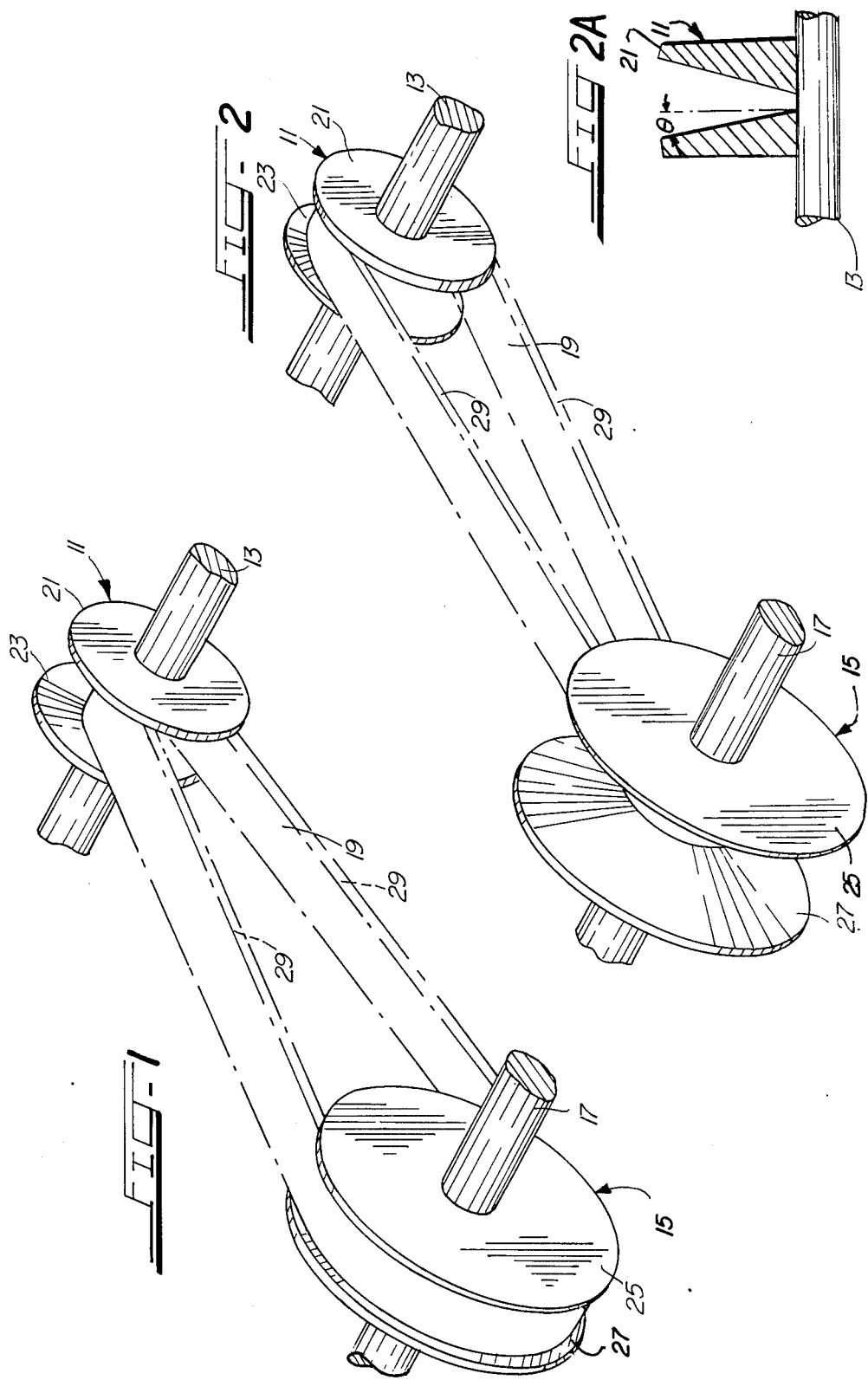

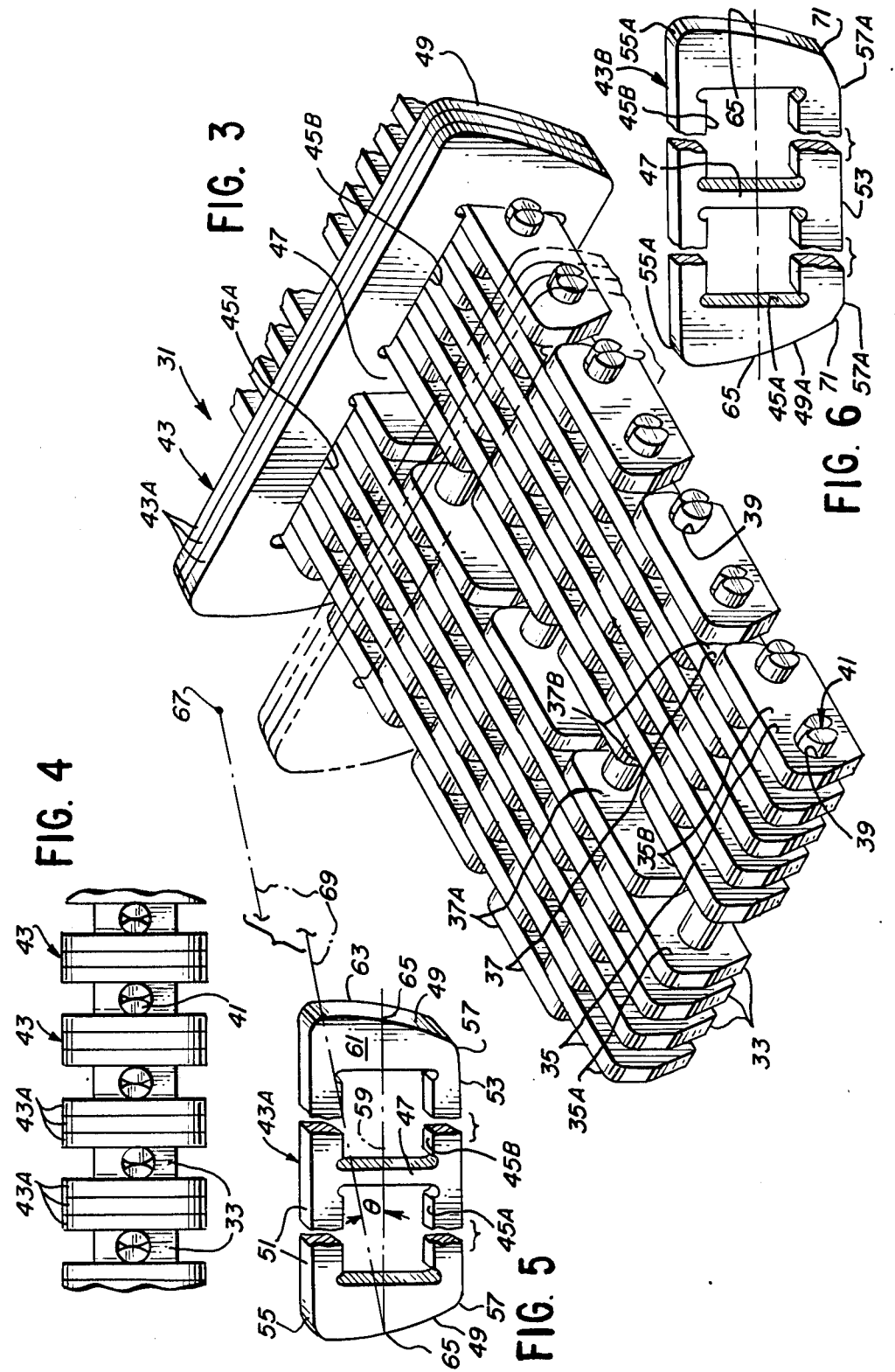

CHAIN-BELT

BACKGROUND OF THE INVENTION

Variable pulley transmissions for transferring torque from an input or drive shaft to an output or driven shaft have been used for some time. In these transmissions, a first pulley constructed of a pair of flanges is mounted on the input shaft such that at least one of its flanges is axially movable with respect to its other flange. A second, similarly constructed and adjustable pulley is mounted on the output shaft. A flexible belt connects the two pulleys to transfer torque therebetween when the input shaft is driven. As the effective diameter of one pulley is changed and, simultaneously, the effective diameter of the other pulley is changed in the opposite direction, the drive ratio between the input and output shafts is adjusted in a smooth, continuous manner.

Automative engineers have long recognized that the maximum operating efficiency of the engine could be achieved if the transmission could be controlled by adjusting to different loads and speed ratios, such that the engine is maintained and operated at its maximum efficiency operating conditions. This is not possible when a conventional geared transmission is teamed with an engine. In the conventional geared transmission, the drive ratio is adjusted in discrete steps, rather than continuously. Accordingly, efforts have been directed to the use of a continuously variable transmission (CVT) of the type described above. These efforts have resulted in the production and marketing in Europe of the DAF passenger car, using a flexible, continuous rubber belt to drivingly interconnect the pulleys. Such a belt is subject to wear by reason of the torque it must handle and operates under severe temperature, vibration and other adverse conditions. To improve the belt life, efforts have been channeled to produce a flexible belt of metal, and some of these efforts are described in the patent literature.

Flexible metal belts for use with CVTs are generally of two varieties, those referred to as "push" belts and those referred to as "pull" belts. An example of a push belt is described in Van Doorne et al U.S. Pat. No. 3,720,113 and an example of a pull belt is described in Cole, Jr. et al U.S. Pat. No. 4,313,730. The Van Doorne et al belt comprises an endless carrier constructed of a plurality of nested metal bands and an endless array of load blocks longitudinally movable along the carrier. Each block has edge surfaces frictionally engaging the pulley flanges of a pulley transmission to transmit torque between the pulleys. The pull belt of Cole, Jr. et al utilizes an endless chain as the carrier, the sets of links of which are pivotably interconnected by pivot means, shown as round pins. Generally trapezoidal (when viewed from the front) load blocks encircle the links; however, the load blocks are constrained against longitudinal movement along the chain by the pivot means.

The push belt as described is relatively expensive to manufacture because the nested carrier bands are precisely matched to each other. Such a belt must be installed and/or replaced as a complete, endless loop, and thus disassembly of parts of the pulley transmission is required, not only for the initial assembly, but also for replacement due to failure of one or more load blocks or one or more of its carrier bands.

The pull belt offers a less expensive alternative to the push belt. No precise matching of carrier parts is required. The belt can be assembled with a finite length, positioned around the pulleys, and the ends of the belt then are connected by a pivot member to make an endless belt. Thus disassembly of the pulleys is not required either for initial installation or for replacement of a belt.

Load blocks have a tendency to rock or tilt with respect to the carrier, especially when entering the pulley. Thus the edge surfaces may engage the pulley flanges slightly askew to a radial line. When the block's "window" or "windows", i.e., the opening or openings in which the carrier is located, are made with square defining edges, as is customary when the blocks are stamped from sheet metal, the tilting of the blocks causes the top and/or the bottom window defining edges to dig into and damage the carrier, thus weakening the carrier and seriously affecting its ability to transmit torque. The damage to the carrier leads to its premature failure. One approach to solving this problem and not yet proven is to make the top and bottom window defining surfaces from front to back slightly round or arcuate. This procedure adds to the manufacturing costs of the belt.

Load blocks for use with either carrier system have been constructed with generally flat, planar, pulley-flange-engaging edge surfaces. These surfaces are, at times, joined to the top and bottom surfaces of the blocks by curved surfaces of small radii which have no effect on block-pulley contact. Load blocks, during their torque transmitting operation, are pulled inwardly of each pulley and are thus subjected to transversely applied compressive loads which unduly stresses the blocks and which can lead to their failure.

SUMMARY OF THE INVENTION

According to the present invention, a modified load block is used to construct a CVT belt. The invention will be described with reference to a pull type belt such as taught, by way of example, in Cole et al, previously referred to, and the complete belt assembly will be referred to as a "chain-belt." The load block used for descriptive purposes is a multi-windowed block, as described and claimed in a co-pending application of Cole et al, Ser. No. 485,781, filed Apr. 4, 1983, now U.S. Pat. No. 4,512,754. It will become apparent that the load block of this invention has broad applications, and is not limited to environments such as the Cole et al references.

In accordance with the invention, the pulley-flange-engaging edge surfaces of each block are "crowned" or rounded, or curved, as contrasted to conventional flat surfaces generally provided on the block edges. "Crowned" means that the block edge surfaces, which engage the pulley flanges, are curved or arcuate along a substantial portion of their length. They present a convex surface to the pulley flanges. Theoretically, crowning the flange-contacting edge surfaces of the blocks produces an initial point contact with the adjacent portions of the pulley flanges, but because of the side-to-side compressive load on the blocks, in reality the crowned block surfaces are distorted and thus contact the flange surfaces over a significant area which is much greater than the initial point contact. The undesirable, initial tilting or rocking of the blocks with respect to the pulley flanges can be at least partially, if not entirely, eliminated by selecting a particular location of the points on the block sides which initially contact the pulley. It has been found that an effective location of the initial block contact point on the edge surfaces lies on a horizontal centerline of the block's window or windows. Also, the center of the curve of the block's edges lies on a line intersecting the initial contact point and defining with the centerline an angle substantially that of the angle of the pulley flange. The radius dimension of the crowned edge surface is approximately five times the width of the block, or more, i.e., a dimension far in excess of any other dimension of the block. In one form of block, the major portion of the block's side edges are crowned; in another form of block, only a substantial portion of the side edges are crowned with the remainder cut away, so as not to contact the pulley flanges.

BRIEF DESCRIPTION OF THE DRAWINGS

FIGS. 1 and 2 are perspective illustrations of a pulley transmission in which the pulleys are interconnected by a belt showing the pulleys in a first drive ratio (FIG. 1) and in a second drive ratio (FIG. 2);

FIG. 2A is a partial cross-sectional view of a portion of a pulley showing the angle of a flange thereof;

FIG. 3 is a perspective view of a portion of a chain-belt constructed in accordance with this invention;

FIG. 4 is a side view of a chain belt segment similar to that of FIG. 3;

FIG. 5 is a perspective view partly broken away, of a load block plate constructed according to this invention and usable in a chain-belt as shown in FIGS. 3 and 4; and FIG. 6 is a perspective view partly broken away, of a second embodiment of a load block constructed according to this invention, and also usable in a chain-belt as shown in FIGS. 3 and 4.

DETAILED DESCRIPTION OF THE PREFERRED EMBODIMENT

FIGS. 1 and 2 of the drawings illustrate a continuously variable transmission (CVT) in an underdrive and an overdrive ratios. A first pulley 11 is connected to a shaft 13 and a second pulley 15 is connected to a shaft 17. One shaft is a drive shaft and the other shaft is a driven shaft. A continuous, flexible belt 19 interconnects the pulleys 11 and 15. In order to change the drive ratio between the pulleys and the shafts, flange 21 of pulley 11 is made axially movable with respect to flange 23, and corrrespondingly, flange 27 of pulley 15 is axially movable with respect to flange 25. It is understood that both flanges of a pulley may be axially movable with respect to each other, but generally this is not necessary to effect the changes in the drive ratios between the pulleys and their respective shafts. The flange angle, that is, the angle defined by a line on the flange surface which intersects a line perpendicular to the pulley shaft, is designated $\theta$ in FIG. 2A. The flange angle is the same for each pulley 11 and 15. Various types of controls may be used to effect the changes in drive ratio but these are not within the purview of this invention and need no further reference. As can be readily understood, the side surfaces or edges 29 of the continuous, flexible belt 19 frictionally engage the pulley flanges when transmitting torque from the drive pulley to the driven pulley.

As mentioned previously, one type of drive belt to interconnect the pulleys is referred to as a chain-belt. This invention is directed to an improvement in this type of belt, although the inventive concept can be used with other types of flexible belts using drive blocks to frictionally engage the flanges of the pulleys of a pulley transmission. FIGS. 3 and 4 illustrate various features of a chain-belt 31 (only a segment of a complete, endless belt being shown) constructed according to this invention. The chain-belt 31 has a carrier comprising metal links 33 economically stamped from sheet metal and arranged in sets 35 and 37 which are interleaved with one another. A "set" of links is those links which are grouped transversely together. Here each set 35 and 37 includes two subsets 35A, 35B and 37A, 37B, spaced apart from each other for reasons that will become apparent. Each link 33 defines a pair of spaced apertures 39, each aperture being adjacent to an end of the link, and the apertures in a set of links are transversely aligned with one another. When interleaved with other sets of links, the apertures at one end of a set of links are transversely aligned with those at one end in the interleaved set, so that a pivot means 41 can be passed therethrough. The pivot means defines an axis about which the next adjacent links pivot and is illustrated as a pin and rocker joint. A preferred form of pin and rocker is described and claimed in a copending application of Cole, Ser. No. 442,386, filed Nov. 17, 1982 now U.S. Pat. No. 4,507,106, and comprises a pair of similarly shaped and sized members having rocking surfaces of a first, generally large radius joined to rear surfaces of a smaller radii. While the pivot means are each illustrated as a pin and rocker, it should be understood that other forms of pivot means, such as the conventional round pin, can be used without departing from the invention.

To frictionally engage the pulley flanges, a plurality of load or drive blocks 43 are used. The load blocks 43 illustrated are each constructed of a plurality of plates 43A which can economically be stamped from sheet metal. They can be of one piece construction if desired. FIG. 5 illustrates in more detail one form of load block plate 43A constructed according to this invention. Generally a load block is positioned to encircle a set of links between pivot means and the block defines, in the illustrated form, a pair of centrally located windows 45A and 45B separated by a strut 47. Each load block has a pair of side or edge surfaces 49 for engaging the pulley flanges. Blocks are generally trapezoidal in shape when viewed from the front as illustrated in FIG. 5, and are also sometimes referred to as being generally V-shaped. The edge surfaces 49 of the block are joined to the top and bottom surfaces 51 and 53 by curved surfaces 55 and 57 of very small radii to avoid sharp edges.

As noted before, one problem of conventional chain-belts is the tilting or rocking of load blocks when they enter a pulley, sometimes causing at least one edge of the window to dig into the chain links, weakening the links and ultimately causing failure of the chain-belt. To at least partially eliminate this problem, according to the present invention the side or edge surfaces 49 of the blocks 43 are "crowned." Also, according to this invention, the initial contact points of the side edges of the blocks and the pulleys are preferably located with reference to a horizontal line 59 through the windows of the blocks.

"Crowned" means to convexly curve the surfaces 49, with the radius of curvature thereof of a length far in excess of any other dimension of the block itself. For example, the radius of curvature can be of a magnitude far in excess of the width (that dimension of the block from side-to-side and across the block from points 65 to 65 as shown in FIG. 5) dimension of the block. Values in the range of one-half of a reference value to five times a reference value are considered in the same magnitude as the reference value. Accordingly used herein and in the appended claims, a magnitude greater is from five to fifty times (or more) the reference value. A radius of curvature of 8 inches for blocks 1.25 inches wide has been successfully tested. The pulley-engaging surfaces are curved between the surfaces 55 and 57, but are not curved along the thickness of the block, i.e., from front 61 to back 63.

The initial pulley contact points 65 preferably are located on a horizontal line 59 through the windows 45A, 45B. The center 67 of the arc defining the left edge 49 is located on a line 69 intersecting the edge 49 and the line 59 at the point 65 at the block edge, and likewise, but not shown, the center 67 of the arc defining the right edge 49 is located at the intersection of lines 69 and 59 at the right hand point 65 on the block edge 49. The line 69 and the centerline 59 define angle $\theta$ which is equal to the flange angle as shown in FIG. 2, while the center 67 is shown for left-hand surface 49, a similar center 67 is used to generate right-hand surface 49.

In the FIG. 6 embodiment of the load block plates 43B, the crowned edge surfaces 49A do not extend completely between the surfaces 55A and 57A. In this embodiment, surfaces 49A are relieved to form the set-back surfaces 71, either during formation of the plates, after being formed, or after the parts are assembled. Surfaces 71 are set-back so they do not contact the pulley flanges. In the alternative, the upper surfaces of the blocks can be such as to not contact the pulley flanges.

The links, pivot means and blocks are preferably made of steel and the links and pivot means are generally hardened. The load or drive blocks, as previously mentioned, can be of one piece construction or laminated of a plurality of stamped elements. They may also be produced by powdered metal techniques.

The load blocks in a chain-belt constructed according to this invention have shown significantly improved life than straight sided blocks under similar test conditions.

While the invention has been generally described with reference to its preferred embodiment in which the carrier is constructed of interconnected sets of links, the appended claims are intended to cover all reasonable equivalents, including the use of other types of carriers for the blocks. Also, the invention can be used where the chain-belts are constructed with single windowed blocks, as illustrated in the aforesaid Cole et al patent.

We claim:

1. An improved endless, flexible chain-belt for drivingly connecting the pulleys of a pulley transmission, each pulley of which is constructed of a pair of flanges to define therebetween a generally V-shaped space, said chain-belt comprising:

a plurality of sets of links with the links of one set interleaved with the links of the next adjacent set, each link defining a pair of apertures, each of which is near the ends thereof with the apertures in a set of links transversely aligned with one another to define groups of apertures, one group of apertures in one set of links being transversely aligned with a group of apertures in the next adjacent and interleaved set of links;

pivot means in each aligned group of apertures to connect the links and permit articulation of the sets of links relative to the next adjacent and interleaved sets of links, each of said pivot means defining an axis about which the links pivot; and a plurality of drive blocks, each of which defines at least one window, permitting each block to encircle a set of links, each drive block being generally V-shaped and having a pair of side drive surfaces adapted to drivingly contact the pulley flanges, each window defining a horizontal line locating the initial point of pulley contact with said block, said side drive surfaces having a major portion thereof crowned so as to present a convex surface to said pulley flanges, each convex surface having a radius of curvature of a magnitude of from five to fifty times or more of the width of the drive block.

2. An improved chain-belt as recited in claim 1, in which each side drive surface has a crowned portion, and has another portion shaped so as to avoid contact with said pulley flanges.

3. In a power transmission apparatus having a pair of spaced pulleys, one connected to an input shaft and the other connected to an output shaft with each pulley being constructed of a pair of flanges so as to define a generally V-shaped space therebetween, and an endless metal belt drivingly interconnecting the pulleys, said belt comprising an endless carrier elements and drive blocks along the length thereof encircling and operatively associated with the carrier element, each drive block being generally trapezoidal in shape when viewed from the front and having side drive surfaces adapted to frictionally engage the pulley flanges, the improvement comprising at least a substantial portion of the length of the drive block side drive surfaces being convexly curved.

4. Apparatus as recited in claim 3, where said carrier element comprises a plurality of sets of links, each set being interleaved with the next adjacent sets, and pivot means joining each set of links to its two adjacent sets of links.

5. Apparatus as recited in claim 4, where each load block is located between a pair of adjacent pivot means.

6. Apparatus as recited in claim 3, in which each side drive surface has a curved portion and a second portion, said second portion being so shaped to avoid contact with said pulley flanges.

7. A load block for a belt adapted to drivingly interconnect at least a pair of pulleys, each having flanges drivingly engaged by the belt, comprising:

a generally trapezoidal member defining at least one window with a carrier therein, said member also defining side edges for drivingly engaging said pulley flanges, said side edges being crowned for at least a portion of their length and free of curvature from front to back.

8. A load block as recited in claim 7, in which said side edges are crowned for their entire length.

9. a load block as recited in claim 7, in which each side edge has a crowned portion, and has another portion shaped so as to avoid contact with said pulley flanges.

10. A load block as recited in claim 7, in which each window defines a horizontal line locating the initial point of pulley contact with said block.

11. A load block as recited in claim 10, wherein the radius of curvature of each crowned portion is from five to fifty times the width of the load block and intersects the horizontal line at an angle equal to the flange angle of a pulley face.

12. An improved endless, flexible chain-belt for drivingly connecting the pulleys of a pulley transmission, each pulley of which is constructed of a pair of flanges to define therebetween a generally V-shaped space, said chain-belt comprising:

a plurality of sets of links with the links of one set interleaved with the links of the next adjacent set, each link defining a pair of spaced apertures, each of which is near an end thereof with the apertures in a set of links transversely aligned with one another to define groups of apertures, one group of apertures in one set of links being transversely aligned with a group of apertures in the next adjacent and interleaved set of links;

pivot means in each aligned group of apertures to connect the links and permit articulation of the sets of links relative to the next adjacent and interleaved sets of links, each of said pivot means defining an axis about which the links pivot, said pivot means comprising a pin and rocker each having similar cross-sections and sizes and each having an arcuate surface, the arcuate surface of a pin engaging the arcuate surface of its rocker; and a plurality of drive blocks, each of which defines at least one window permitting said block to encircle at least one set of links, each drive block being generally V-shaped and having a pair of side edges adapted to drivingly engage the flanges of the pulleys, said side edges having at least a portion thereof crowned so as to present a convex surface to said pulley flanges, each convex surface having a radius of curvature of a magnitude of five to fifty times the width of the drive block, each window defining a horizontal line upon which initial pulley contact with said block is located.

13. An improved chain-belt as recited in claim 12, in which said blocks each define a pair of side-by-side windows, permitting each block to encircle laterally separated portions of a set of links.

14. An improved chain-belt as recited in claim 12, wherein the angle of intersection of said radius of curvature with said horizontal line equals the flange angle of said pulley faces.

* * * * *

UNITED STATES PATENT OFFICE
CERTIFICATE OF CORRECTION

Patent No. 4,622,025         Dated November 11, 1986

Inventor(s) John M. Kern and George A. Zimmer

It is certified that error appears in the above-identified patent and that said Letters Patent are hereby corrected as shown below:

Column 6, line 23, cancel "elements" and insert
-- element --.

Signed and Sealed this

Third Day of March, 1987

Attest:

DONALD J. QUIGG

Attesting Officer

Commissioner of Patents and Trademarks